(12) United States Patent
Tichy

(10) Patent No.: US 8,310,222 B2
(45) Date of Patent: Nov. 13, 2012

(54) METHOD OF FORMING A POWER SUPPLY CONTROLLER AND STRUCTURE THEREFOR

(75) Inventor: Tomas Tichy, Jihlava (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 364 days.

(21) Appl. No.: 12/757,238

(22) Filed: Apr. 9, 2010

(65) Prior Publication Data

US 2011/0248696 A1 Oct. 13, 2011

(51) Int. Cl.
*G05F 1/00* (2006.01)

(52) U.S. Cl. .......................... 323/283; 323/284; 323/288

(58) Field of Classification Search .................. 323/283, 323/284, 282, 288
See application file for complete search history.

(56) References Cited

U.S. PATENT DOCUMENTS

| 4,536,700 | A | * | 8/1985 | Bello et al. ..................... 323/285 |
| 4,546,421 | A | * | 10/1985 | Bello et al. .................. 363/21.18 |
| 4,931,717 | A | * | 6/1990 | Gray et al. ..................... 323/299 |
| 7,227,344 | B2 | | 6/2007 | Kogel et al. |

* cited by examiner

*Primary Examiner* — Shawn Riley
(74) *Attorney, Agent, or Firm* — Robert F. Hightower

(57) ABSTRACT

In one embodiment, a power supply controller forms a compensation current modulates a value of the feedback signal responsively to a value of a timing control signal used to form a clock signal.

17 Claims, 4 Drawing Sheets

METHOD OF FORMING A POWER SUPPLY CONTROLLER AND STRUCTURE THEREFOR

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form power-supply controllers that were utilized to regulate an output voltage of a power supply. In some types of power supply controllers, such as hysteretic mode power supply controllers, it could be difficult to produce a power supply that had duty cycle stability. A hysteretic power supply usually is regarded as a switching power supply in which the switching frequency and duty cycle are determined by a sequential switching circuit with two states. For such power supplies, it was often necessary to use an LC output filter that had a capacitor with a high equivalent series resistance (ESR). The high equivalent series resistance (ESR) often resulted in the output voltage having a ripple voltage that was very high which could cause improper operation of the load or even damage to the load. For the case of using a capacitor with a low ESR, the low ESR reduced the ripple on the output voltage but the low ripple voltage often cause inaccurate detection of the output voltage value which could result in an irregular duty cycle and sometimes resulted in pulse skipping or cycle skipping, both of which could cause undesirable audible noise.

Accordingly, it is desirable to have a power supply controller that can operate with a range of capacitors including a low ESR capacitor or a high ESR capacitor and have a more regular duty cycle, have reduced pulse skipping, and have reduced audible noise.

Figure 1:
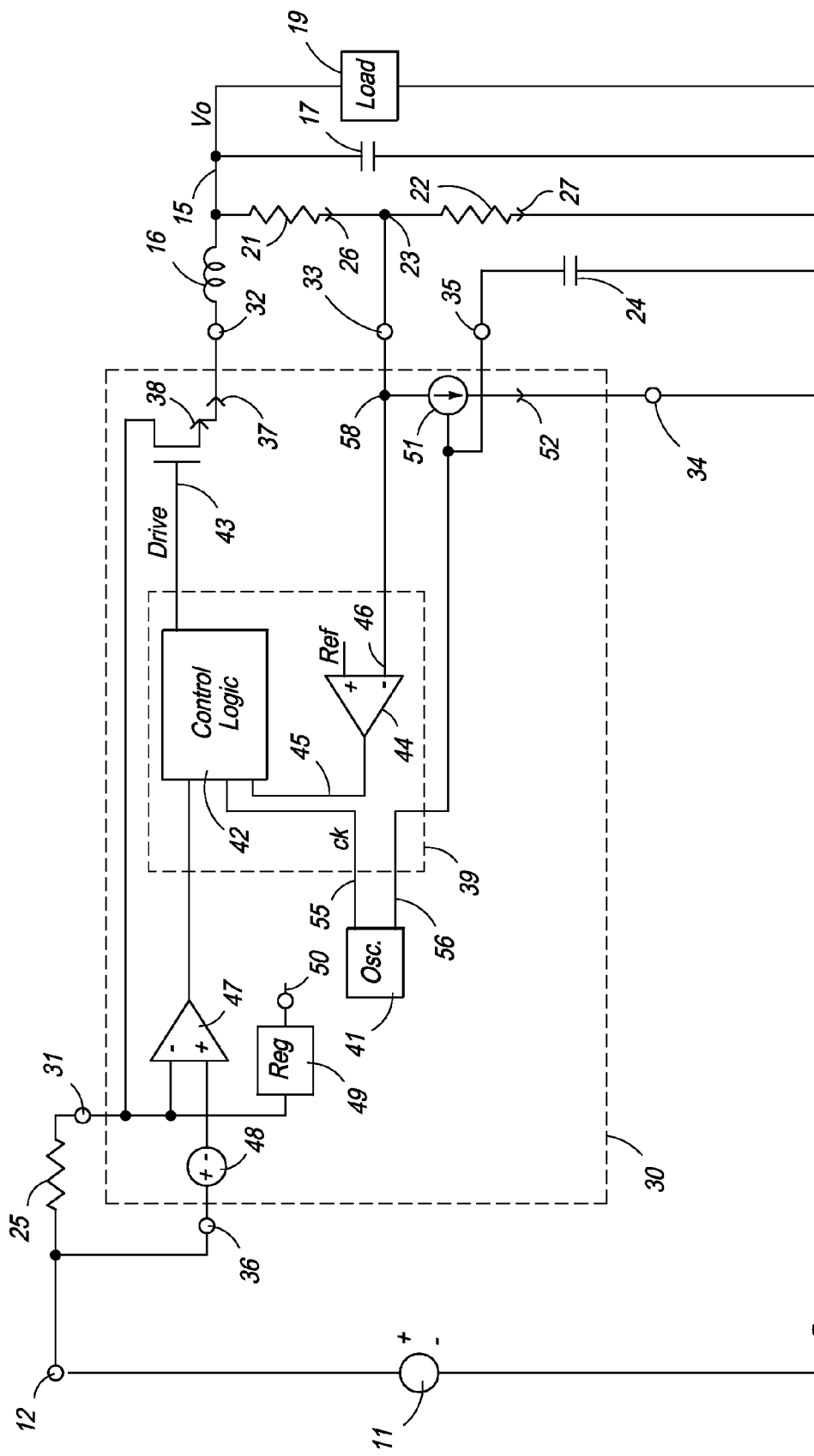
FIG. 1 schematically illustrates an embodiment of a portion of a power supply system that includes a preferred embodiment of a hysteretic power supply controller in accordance with the present invention.

For simplicity and clarity of the illustrations, elements in the figures are not necessarily to scale, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. Additionally, the term while means that a certain action occurs at least within some portion of a duration of the initiating action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten to fifteen percent (10%-15%) are reasonable variances from the ideal goal of exactly as described. When use in reference to a state of a signal, the term asserted means an active state of the signal and negated means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, are used for distinguishing between similar elements and not necessarily for describing a sequence, either temporally, spatially, in ranking or in any other manner.

DETAILED DESCRIPTION OF THE DRAWINGS

FIG. 1 schematically illustrates a portion of an exemplary embodiment of a power supply system 10 that includes a preferred embodiment of a hysteretic power supply controller 30. For clarity of the explanation, the operation of the preferred embodiment of controller 30 is explained; however, other embodiments could provide similar operation. System 10 receives an input voltage between an input terminal 12 and a common return terminal 13 and regulates an output voltage (Vo) to a desired value at an output node 15 in order to supply power to a load 19. The output voltage is regulated to a target value within a range of values around the target value. For example, the target value may be five volts (5 v) and the range of values may be plus or minus five percent (5%) around the five volts. System 10 usually receives the input voltage as a dc voltage or a rectified sine wave voltage such as from a voltage source 11. An inductor 16 usually is coupled to output node 15 and an energy storage capacitor or filter capacitor 17 usually is connected between node 15 and terminal 13. A feedback network, illustrated as a voltage divider that includes series connected resistors 21 and 22, typically is connected between node 15 and terminal 13 in order to form a feedback (FB) signal at a common node 23 that is formed from the output voltage. In one embodiment, the feedback signal is representative of the value of the output voltage plus an offset signal.

Controller 30 typically receives operating power between a voltage input 31 and a common return 34. Controller 30 includes an oscillator circuit or oscillator 41 that forms a clock (CK) signal on an output 55 that assist in forming an operating frequency for controller 30. Oscillator 41 also includes a timing control output 56 that is connected to an output 35 of controller 30. Oscillator 41 also forms a timing control signal on output 56. Output 35 typically is connected to a timing capacitor 24 to assist in forming the frequency of the clock signal on output 55. A feedback input 33 of controller 30 is configured to receive the feedback (FB) signal from common node 23. A power switch, such as an MOS power transistor 38, of controller 30 is used to couple a voltage to inductor 16 and supply an output current 37 to inductor 16 in order to regulate the value of the output voltage. Although transistor 38 is illustrated as an N-channel MOS transistor, other power switch configurations may also be used including a half-bridge switch configuration.

In some embodiments controller 30 may include an optional internal regulator 49 that receives the input voltage from input 31 and forms an internal operating voltage on an output 50 that is utilized to supply power to some of the elements of controller 30 such as oscillator 41, comparator 44, and control logic 42. Controller 30 may also include an optional over-current control circuit, such as a comparator 47 this used to supply a control signal to circuit 39 when the value of current 37 is greater than a maximum current level. For such an over-current circuit, controller 30 may also include an input 36 that is used to receive a current sense signal, such as from a resistor 25, and a voltage offset 48 that can be used to assist in detecting the over-current condition. Other well-known current sensing circuits and techniques may also be used instead of comparator 47, resistor 25, and offset 48.

A pulse circuit 39 of controller 30 includes a comparator 44 and control logic 42. Comparator 44 has an output 45. Pulse circuit 39 is configured to receive the feedback signal from input 33 through a feedback node 58. A reference generator forms a reference signal or Ref that is received on a non-inverting input of comparator 44. Pulse circuit 39 is configured to form a drive signal on an output 43 that is used to control transistor 38 in order to regulate the value of the output voltage to the desired value.

As will be seen further hereinafter, controller 30 is configured to form a modulated feedback (FB) signal that decreases the value of the FB signal at least during the portion of a cycle when controller 30 can enable transistor 38. This modulated FB signal with the decreasing value assists in preventing comparator 44 from prematurely detecting that the output voltage value has increased to a value that requires controller 30 to reduce the amount of power delivered to keep the output voltage at the desired value, such as by skipping cycles. Controller 30 includes a variable current source 51 that assists in forming the modulated FB signal. Source 51 forms a compensation current 52 responsively to the value of the timing control signal on output 56 of oscillator 41. The feedback signal is representative of the output voltage plus the offset signal formed by the compensation current.

Figure 2:
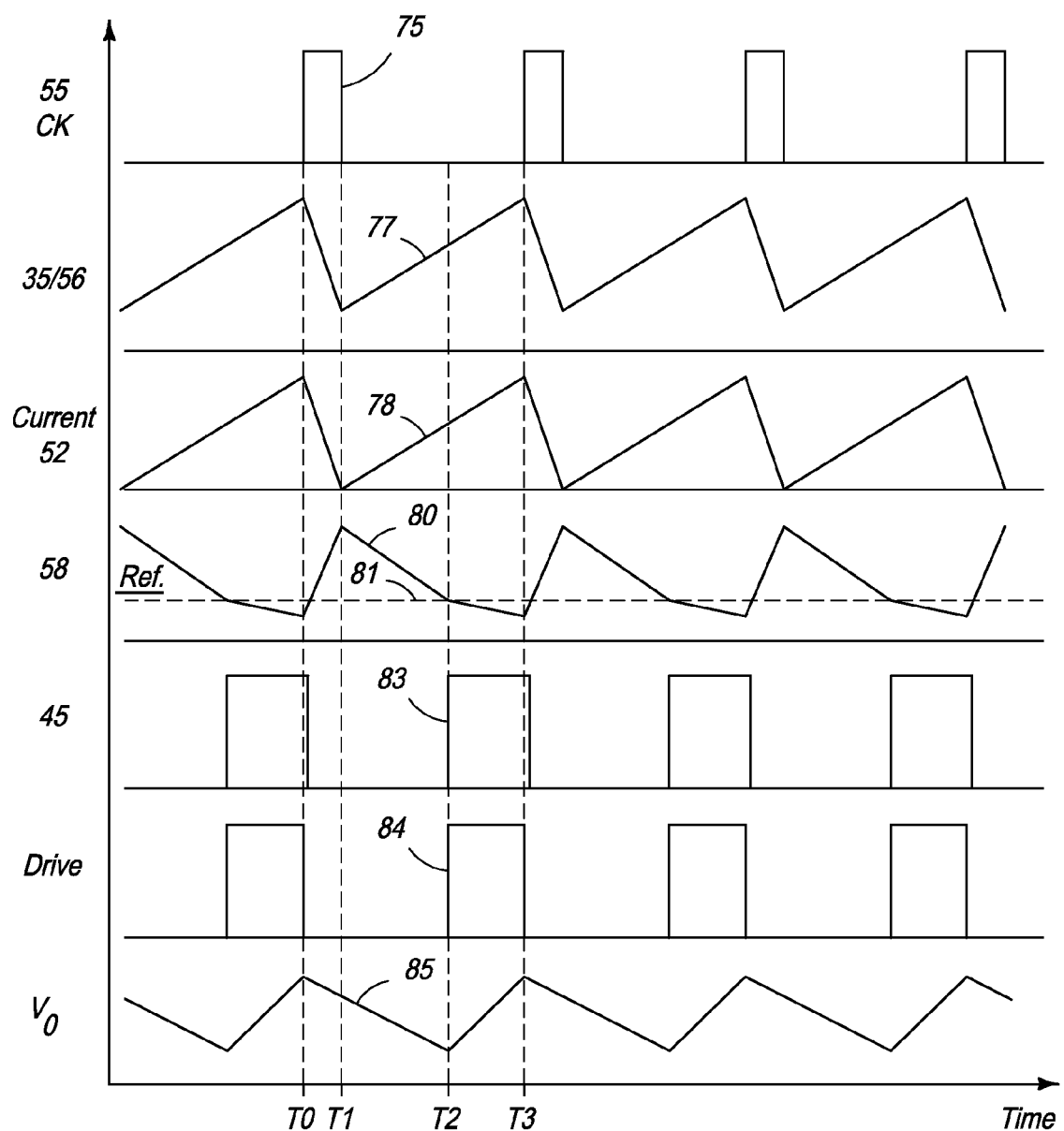
FIG. 2 is a graph having plots that illustrate some of the signals formed during the operation of the controller of FIG. 1 in accordance with the present invention.

FIG. 2 is a graph having plots that illustrate some of the signals formed during the operation of controller 30. The abscissa illustrates time and the ordinate illustrates an increasing value of the illustrated signal. A plot 75 illustrates the clock signal on output 55 of oscillator 41 and a plot 77 illustrates the timing control signal on output 56. A plot 78 illustrates current 52 from source 51. A plot 80 illustrates a modulated feedback signal formed at node 58 by current 52 and a dashed plot 81 illustrates the value of the reference (Ref) signal formed by the reference generator. A plot 83 illustrates the value of output 45 of comparator 44, a plot 84 illustrates the drive signal on output 43 of circuit 39, and a plot 85 illustrates the value of the output voltage (Vo) on node 15.

This description of the operation of the preferred embodiment of controller 30 has references to FIG. 1 and FIG. 2. In operation, the clock signal (CK) on output 55 of oscillator 41 is used to set the operating frequency of the drive signal on output 43 of circuit 39. Circuit 39 is configured to negate the drive signal when the clock signal is asserted thereby also disabling or turning-off transistor 38. Circuit 39 is also configured to assert the drive signal only when the clock signal is negated and if the value of the output voltage is low enough to require increasing as determined by comparator 44. Thus, circuit 39 may assert the drive signal to enable transistor 38 only during the negated portion of the clock signal depending on the value of the output voltage. Oscillator 41 forms the clock signal by charging and discharging capacitor 24. Typically, oscillator 41 supplies a current from output 56 to charge and discharge capacitor 24. In this preferred embodiment the charging time of capacitor 24 forms the negated time of the CK signal and the discharge time of capacitor 24 forms the asserted state of the CK signal. This can be seen in FIG. 2 where plot 75 is low while plot 77 is increasing, and plot 75 is high while plot 77 is decreasing. This charging and discharging of capacitor 24 forms a sawtooth shaped waveform for the timing control signal on output 56 of oscillator 41.

The timing control signal is received on a control input of current source 51 and is used to control the value of current 52. As the value of the timing control signal increases, source 51 increases the value of current 52 and decreasing values of the timing control signal causes source 51 to decrease the value of current 52 as the illustrated plot 78. Current source 51 is configured so that current 52 forms a modulated FB signal at node 58 by modulating or changing the value of the FB signal formed by resistors 21 and 22. A current 26 flows through resistor 21 and a current 27 flows through resistor 22. When current 52 is substantially zero, the value of currents 26 and 27 are substantially equal and the value of the signal on node 23 is representative of the value of the output voltage, thus, current 52 modulates the value of the feedback signal so that controller 30 modulates the value of the feedback signal to form the modulated FB signal. Source 51 causes current 52 to flow through resistor 21 thereby changing or modulating the value of current 26 and the voltage across resistor 21.

Assume that at a time T0, capacitor 24 has charged to an upper value which causes oscillator 41 to assert the clock signal to begin discharging capacitor 24 as illustrated by plots 75 and 77. Circuit 39 is configured to negate the drive signal responsively to the asserted CK signal. The asserted CK signal negates the drive signal on output 43 thereby disabling transistor 38. As illustrated by plot 85 at time T0, disabling transistor 38 causes the output voltage to begin decreasing. Since current 52 is controlled by the timing control signal, current 52 also begins to decrease at time T0 as illustrated by plot 78. Since the output voltage has not yet decreased, the reduced value of current 52 causes the value of the modulated feedback signal at node 58 to begin increasing as illustrated by plot 80. Capacitor 24 continues to discharge and the modulated FB signal continues to increase. As the value of the modulated FB signal increases past the Ref value, output 45 of comparator 44 is negated. Oscillator 41 continues to discharge capacitor 24, and source 51 continues to decrease the value of current 52 thereby increasing the value of the modulated FB signal, until the value of the voltage on capacitor 24 reaches the lower voltage limit at a time T1.

Upon reaching the lower voltage limit of capacitor 24, oscillator 41 negates the clock signal and begins charging capacitor 24 as illustrated at time T1. During the negated time of the CK signal, logic 42 may assert the drive signal if comparator 44 detects that the output voltage has decreased to a value that requires supplying current 37. Thus, the negated state of the CK signal forms a window when transistor 38 may become enabled. Charging capacitor causes the value of the timing control signal to begin to increase as illustrated at time T1. Source 51 responsively begins increasing the value of current 52 as illustrated by plot 78. Since at time T1 the modulated FB signal is greater than the Ref signal, the output of comparator 44 is negated. Control logic 42 receives the negated output from comparator 44 and negates the drive signal in order to keep transistor 38 disabled. The increasing value of the timing control signal after time T1 causes the value of current 52 to increase as illustrated by plot 78. Current 26 is the sum of currents 52 and 27. Thus, increasing the value of current 52 also increases the value of current 26. Increasing current 26 increases the voltage drop across resistor 21 thereby decreasing the value of the modulated FB signal at node 58 to a value that is lower than it would be without current 52. The modulated FB signal continues to decrease and at a time T2 decreases to a value that is less than the Ref signal thereby asserting the output of comparator 44. Logic 42 receives asserted output from comparator 44 and because the CK signal remains negated, logic 42 asserts the drive signal (plot 84) to enable transistor 38 at time T2. As can be seen, the modulated FB signal has a decreasing value or negative slope during the window when transistor 38 may be enabled (between times T1 and T3) and especially during the time prior to transistor 38 being enabled. This decreasing value reduces the possibility that the ripple voltage on the output voltage would decrease the value of the output voltage as the FB signal nears the threshold voltage of comparator 44 thereby causing the value of modulated FB signal to quickly transition through the value of the threshold voltage which results in reduced false detections that could otherwise result from the ripple voltage variations of the output voltage. This reduces the possibility of falsely detecting that the output voltage has increased to a value that is greater than the desired value thereby reducing the possibility of false cycle skipping. Thus, it can be seen that this preferred embodiment of controller 30 forms current 52 continuously and proportionally to the value of the timing control signal. Therefore, current 52 is continuously modulating the value of the feedback signal. The proportionality preferably is directly proportional but may be a different proportionality in a different embodiment. One skilled in the art will appreciate that in one embodiment current 52 can be viewed to flow through resistor 21 of the voltage divider and form a compensation voltage across resistor 21 and that the compensation voltage changes the value of the feedback signal to form the modulated feedback signal at node 58.

Enabling transistor 38 at time T2 causes the value of the output voltage to begin increasing as illustrated by plot 85. Even though the value of current 52 is increasing, the increasing value of the output voltage causes the value of the modulated feedback signal to decrease at a slower rate as illustrated by plot 80 at time T2. Since the value of the modulated FB signal continues decreasing to a value that is less than the Ref signal, the drive signal remains asserted. Those skilled in the art will appreciate that if the value of the output voltage had caused the value of the modulated FB signal to increase up to or greater than the value of the Ref signal, comparator 44 would be negated; however, circuit 39, typically logic 42, would not negate the drive signal until the next assertion of the CK signal. For the case of this example where the modulated FB decreases to a value no greater than the Ref signal, the output voltage does not increase to such a value that negates the output of comparator 44. Capacitor 24 continues to charge until reaching the upper voltage limit at time T3 thereby causing oscillator 41 to assert the clock signal and begin discharging capacitor 24. Logic 42 receives the asserted clock signal and negates the drive signal in order to disable transistor 38. This operation continues for each cycle formed by the CK signal and the timing control signal. As will be appreciated by those skilled in the art, controller 30 is configured to form a cycle of the drive signal to have a duration that is substantially the same as a duration of a cycle of the CK signal.

Those skilled in the art will appreciate that the configuration of controller 30 advantageously does not require any external components to form the modulated FB signal. Additionally, since no additional external components are used, such as additional capacitors or transistors, the operating frequency of controller 30 is not limited by the operation of or frequency response of external components.

In order to provide the functionality described herein, a first terminal of source 51 is connected to node 58 and a second terminal of source 51 is connected to return 34. A control input of source 51 is connected to output 56 of oscillator 41 and to output 35. Node 58 is connected to input 33 and to an inverting input of comparator 44 which has a non-inverting input connected to receive the Ref signal.

Figure 3:
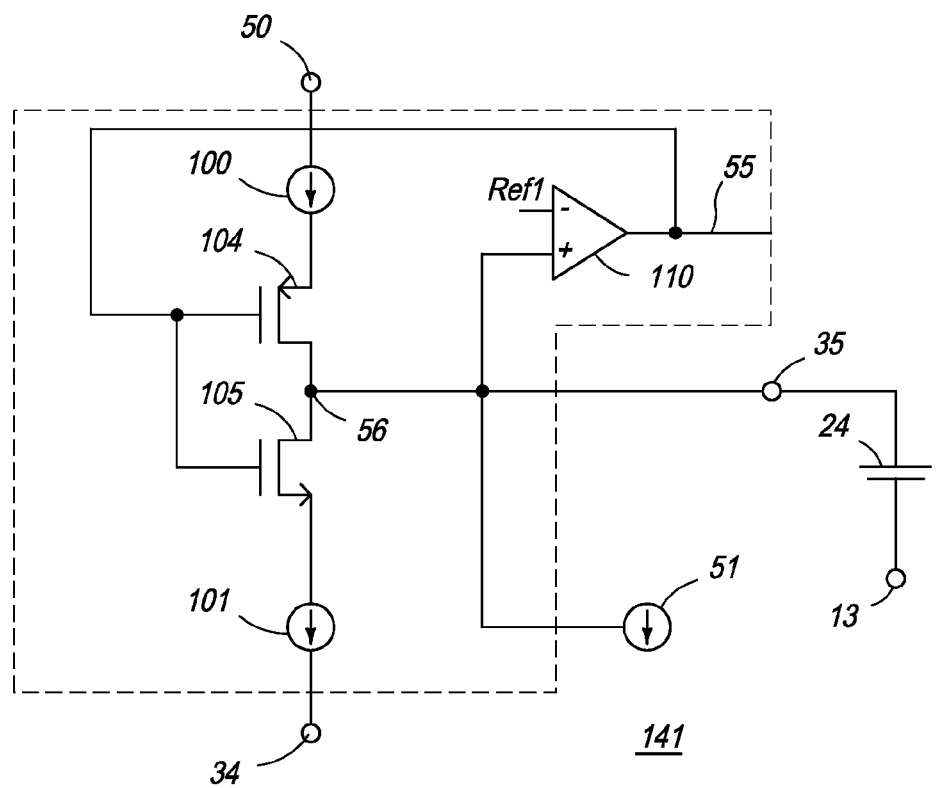
FIG. 3 schematically illustrates a portion of an exemplary embodiment of an oscillator circuit that may be used controller of FIG. 1 in accordance with the present invention.

FIG. 3 schematically illustrates a portion of an exemplary embodiment of an oscillator circuit 141 that may be used for oscillator 41. Circuit 141 includes a substantially constant current source 100 that supplies a charging current to charge capacitor 24 responsively to a first value of the voltage on capacitor 24 and a substantially constant current source 101 that supplies a discharging current to discharge capacitor 24 responsively to a second value of the voltage on capacitor 24. A transistor 104 is configured to supply the current from source 100 to capacitor 24 responsively to the first value and a transistor 105 is configured to supply the current from source 101 to capacitor 24 responsively to the second value. A comparator 110 compares the value of capacitor 24 to a reference signal Ref 1 in order to detect the first and second values. Comparator 110 preferably is a hysteresis comparator in order to improve the accuracy of the detections. In other embodiments, other types of comparators may be used, for example two comparators with two different reference values may be used. Those skilled in the art will appreciate that other well-known oscillator circuits may be used for oscillator 41.

Figure 4:
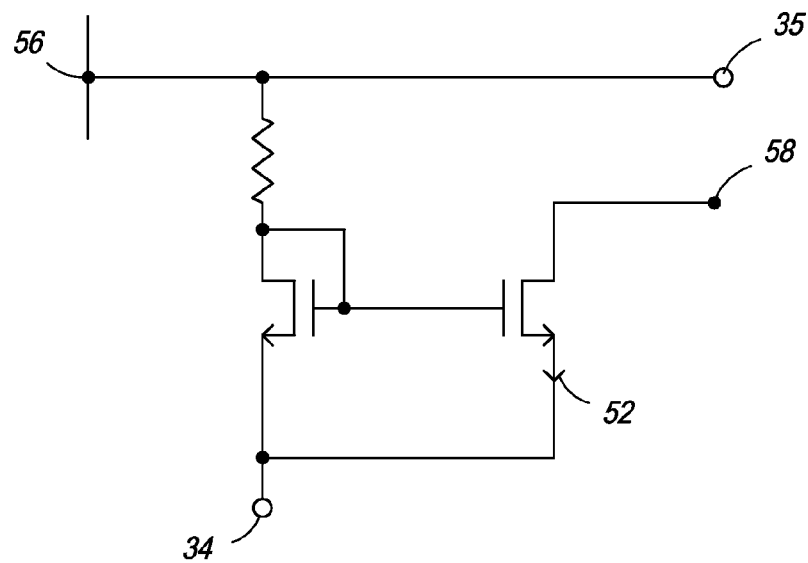
FIG. 4 schematically illustrates a portion of an exemplary embodiment of a current source that may be used controller of FIG. 1 in accordance with the present invention.

FIG. 4 schematically illustrates a portion of an exemplary embodiment of a current source that may be used to generate current 52. Those skilled in the art will appreciate that other well-known oscillator circuits may be used for to generate current 52.

Figure 5:
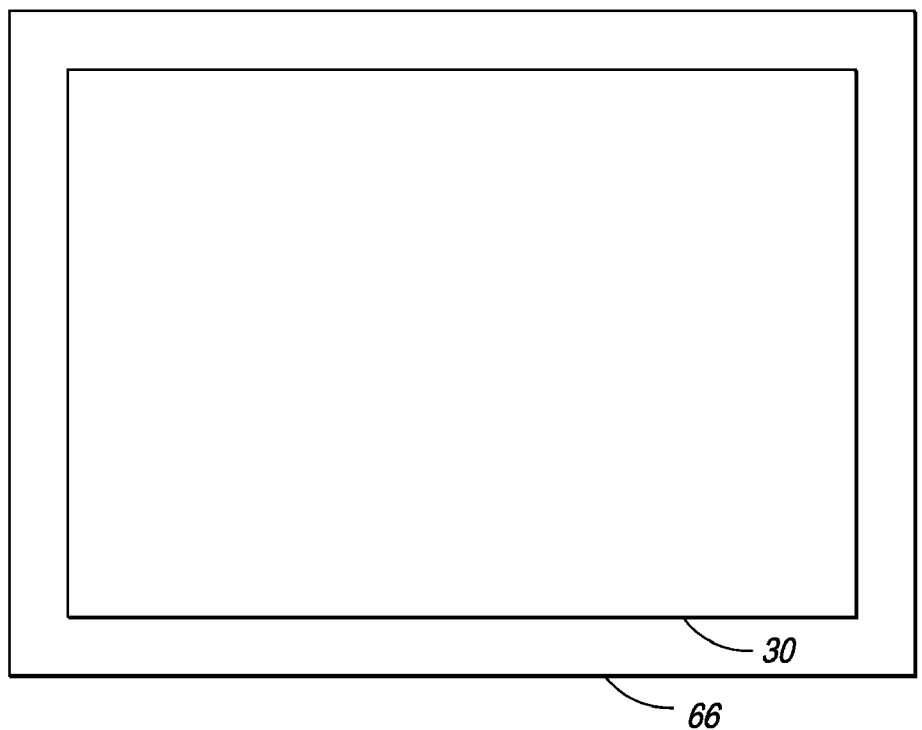
FIG. 5 illustrates an enlarged plan view of a semiconductor device that includes the power supply controller of FIG. 1 in accordance with the present invention.

FIG. 5 illustrates an enlarged plan view of a portion of an embodiment of a semiconductor device or integrated circuit 65 that is formed on a semiconductor die 66. Controller 30 is formed on die 66. Die 66 may also include other circuits that are not shown in FIG. 5 for simplicity of the drawing. Controller 30 and device or integrated circuit 65 are formed on die 66 by semiconductor manufacturing techniques that are well known to those skilled in the art.

Those skilled in the art will appreciated that according to one embodiment of the descriptions herein, a power supply controller for regulating an output voltage may comprise; a feedback node, for example a node 33 or node 58, configured to be coupled in a voltage controlled feedback loop and receive a feedback signal that is formed from the output voltage, such as a feedback signal at node 23; an oscillator circuit, such as oscillator 41, configured to charge and discharge a capacitor, such as capacitor 24, to form a sawtooth signal and configured to use the sawtooth signal to form a clock signal; a pulse circuit, such as circuit 39 for example, configured to use the clock signal and the feedback signal to form a drive signal to control current flow from a power source through an inductor to regulate the output voltage to a desired value; and a current source, for example source 51, configured to form a compensation current that is continuously proportional to the sawtooth signal wherein the power supply controller is configured to use the compensation current to modulate a value of the feedback signal. In one embodiment, the feedback signal is representative of the output voltage and an offset signal.

According to another embodiment of the descriptions herein, those skilled in the art will appreciate that a method of forming a power supply controller may comprise; configuring the power supply controller to form a drive signal to control current through an inductor in order to regulate an output voltage to a desired value; configuring the power supply controller to receive a feedback signal, formed from the output voltage and to use the feedback signal to control the current through the inductor, such as a feedback signal formed at node 23 for example, that is representative of the output voltage; an oscillator circuit configured to charge and discharge a capacitor to form a sawtooth signal, such as the signal formed by the timing control signal on output 56 of oscillator 41 for example, and configured to use the sawtooth signal to form a clock signal; and configuring a current source to form a compensation current, current 52 for example, that is continuously modulating a value of the feedback signal responsively to the value of the sawtooth signal.

Another embodiment of the herein described apparatus includes, a power supply controller for regulating an output voltage comprising: the power supply controller configured to form a drive signal to control current through an inductor in order to regulate an output voltage to a desired value; a feedback node, for example node 23, configured to receive a feedback signal that is representative of the output voltage; an oscillator circuit configured to charge and discharge a capacitor, such as capacitor 24, to form a timing control signal and configured to use the timing control signal to form a clock signal; and a pulse circuit configured to use the clock signal and the feedback signal to form the drive signal; and a current source configured to receive the timing control signal and form a compensation current that is proportional to the timing control signal, the current source coupled to cause the compensation current to flow through the feedback node and modulate a value of the feedback signal.

In view of all of the above, it is evident that a novel device and method is disclosed. Included, among other features, is forming a controller and method therefor that modulates the feedback signal to have a decreasing value or a negative slope during a time that the controller may be enabled to supply current in order to maintain a desired value of the output voltage. Preferably, the modulated feedback signal is continuously modulated for the entire cycle of the drive signal. In the preferred embodiment, the feedback signal is modulated responsively to the charging and discharging of a timing capacitor used to form the cycle of the drive signal. The method and structure does not use additional external components to modulate the feedback signal, thus, the costs are reduced. Since no additional external components are used, the operating frequency of the drive signal and of the controller, such as the CK signal, is not limited by the external components such as by a charging time or a frequency response thereof.

While the subject matter of the invention is described with specific preferred embodiments, the foregoing drawings and descriptions thereof depict only a preferred embodiment of the invention subject matter and are not therefore to be considered to be limiting of its scope, it is evident that many alternatives and variations will be apparent to those skilled in the art. The exemplary form of controller 30 is used as a vehicle to explain the operation method of forming the modulated feedback signal that has a decreasing value or negative slope during a time that the controller may be enabled to supply current to maintain a desired value of the output voltage. Those skilled in the art will appreciate that the signal polarities may be changed and that other circuit implementations may be used as long as the controller modulates the feedback signal to have a decreasing value or negative slope during a time that the controller may be enabled to supply current to maintain a desired value of the output voltage. For example, the signal polarities may be changed and the inputs of comparator 44 may be reversed. Additionally, the location of source 51 may be moved, such as to source current into node 23. Preferably, the modulated feedback signal is continuously modulated for the entire cycle of the drive signal.

Although a buck power supply configuration is used to describe one embodiment of the inventions, those skilled in the art will appreciate that the inventions also would apply to other power supply configurations including, a boost configuration a sepic configuration, a flyback configuration, and a buck-boost configuration. Those skilled in the art will also appreciate that in some embodiments, transistor 38 may be external to controller 30. Also, the subject matter of the invention has been described for a particular MOS transistor structure, although the method is directly applicable to bipolar transistors, as well as to other MOS, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those in the art.

The invention claimed is:

1. A power supply controller for regulating an output voltage comprising:
    a feedback node configured to be coupled in a voltage controlled feedback loop and receive a feedback signal that is formed from the output voltage;
    an oscillator circuit configured to charge and discharge a capacitor to form a sawtooth signal;
    a pulse circuit configured to use the clock signal and the feedback signal to form a drive signal to control current flow from a power source through an inductor to regulate the output voltage to a desired value wherein a cycle of the clock signal forms a cycle of the drive signal; and
    a current source configured to form a compensation current that is continuously proportional to the sawtooth signal wherein the power supply controller is configured to use the compensation current to modulate a value of the feedback signal wherein the compensation current decreases the value of the feedback signal while the drive signal is asserted.

2. The power supply controller of claim 1 wherein the current source is configured to decrease the value of the feedback signal as the value of the sawtooth signal increases.

3. The power supply controller of claim 1 wherein the value of the compensation current is directly proportional to the value of the sawtooth signal.

4. The power supply controller of claim 1 wherein the current source is configured to cause the compensation current to flow through only a portion of a voltage divider that is used to form the feedback signal from the output voltage.

5. The power supply controller of claim 1 wherein the current source is coupled to the feedback node and forms a compensation current responsively to the sawtooth signal wherein the compensation current flows from the feedback node through the current source.

6. The power supply controller of claim 1 wherein when the compensation current is zero the value of the feedback signal is representative of a value of the output voltage and wherein the compensation current is used to form an offset signal that reduces the value of the feedback signal.

7. The power supply controller of claim 1 wherein the current source has a control input coupled to receive the sawtooth signal wherein a value of the compensation current is controlled by a value of the sawtooth signal.

8. A method of forming a power supply controller comprising:
   configuring the power supply controller to form a drive signal to control current through an inductor in order to regulate an output voltage to a desired value;
   configuring the power supply controller to receive a feedback signal formed from the output voltage and to use the feedback signal to control the current through the inductor;
   configuring an oscillator circuit to charge and discharge a capacitor to form a timing control signal; and
   configuring a current source to form a compensation current that is continuously modulating a value of the feedback signal responsively to the value of the timing control signal.

9. The method of claim 8 wherein configuring the current source to form the compensation current that is continuously modulating the value of the feedback signal includes configuring the current source to cause the compensation current to flow through a portion of a voltage divider that is used to form the feedback signal wherein the compensation current forms a compensation voltage in the portion of the voltage divider and wherein the compensation voltage changes the value of the feedback signal.

10. The method of claim 8 wherein configuring the current source to form the compensation current includes configuring the current source to cause the compensation current to decrease a value of the modulated feedback signal during a portion of the clock signal when the drive signal can be asserted.

11. The method of claim 8 further including configuring a comparator to receive the modulated value of the feedback signal and form a control signal representing that the output voltage is less than the desired value.

12. A power supply controller for regulating an output voltage comprising:
   the power supply controller configured to form a drive signal to control current through an inductor in order to regulate an output voltage to a desired value;
   a feedback input configured to receive a feedback signal that is representative of the output voltage;
   an oscillator circuit configured to charge and discharge a capacitor to form a timing control signal and configured to use the timing control signal to form a clock signal that forms a cycle of the drive signal;
   a current source configured to receive the timing control signal and form a compensation current that is proportional to the timing control signal, the current source coupled to cause the compensation current to flow through the feedback input and modulate a value of the feedback signal; and
   a pulse circuit configured to use the clock signal and the modulated value of the feedback signal to form the drive signal.

13. The power supply controller of claim 12 wherein feedback input is configured to receive the feedback signal from a resistor divider, and wherein the current source is configured to cause the compensation current to flow through only a portion of the resistor divider.

14. The power supply controller of claim 12 wherein the feedback input is configured to be coupled to a common node of the resistor divider.

15. The power supply controller of claim 14 wherein the current source continuously forms the compensation current and modulates the value of the feedback signal.

16. The power supply controller of claim 14 wherein the current source continuously forms the compensation current to be directly proportional to the value of the timing control signal.

17. The power supply controller of claim 1 wherein the compensation current is used to form an offset signal that reduces the value of the feedback signal irrespective of the value of the output voltage.

* * * * *